United States Patent
Reimann et al.

[19]

[11] Patent Number: 6,105,383
[45] Date of Patent: Aug. 22, 2000

[54] EVAPORATOR UNIT FOR SMALL BUS

[75] Inventors: Robert C. Reimann, LaFayette; David R. Siegenthaler, Verona, both of N.Y.

[73] Assignee: Carrier Corporation, Syracuse, N.Y.

[21] Appl. No.: 09/393,562

[22] Filed: Sep. 10, 1999

[51] Int. Cl.[7] .................................................. F25D 21/14
[52] U.S. Cl. ................... 62/285; 62/244; 62/407
[58] Field of Search ........................... 62/285, 407, 244, 62/417, 298

[56] References Cited

U.S. PATENT DOCUMENTS

| | | | |
|---|---|---|---|
| 4,098,093 | 7/1978 | Czyl ........................................ | 62/244 X |
| 4,549,405 | 10/1985 | Anderson et al. ..................... | 62/285 X |
| 4,658,599 | 4/1987 | Kajiwara ............................... | 62/244 X |
| 4,888,959 | 12/1989 | Brown .................................... | 62/244 |
| 5,619,862 | 4/1997 | Ruger et al. .......................... | 62/411 X |
| 5,894,737 | 4/1999 | Haeck .................................... | 62/285 |

FOREIGN PATENT DOCUMENTS

| | | |
|---|---|---|
| 411157330 | 6/1999 | Japan . |
| 411192834 | 7/1999 | Japan . |

OTHER PUBLICATIONS

Sales Brochure—"THERM–AIR Bus Air Conditioning Systems".
Sales Brochure—"The Therm–Air New Generation System Gives You More Cool Comfort Per BTU".

*Primary Examiner*—William Doerrler
*Assistant Examiner*—Chen-Wen Jiang
*Attorney, Agent, or Firm*—Wall Marjama Bilinski & Burr

[57] ABSTRACT

An evaporator unit for use in the passenger compartment of a small bus that includes a low profile cabinet mounted in the ceiling of the passenger compartment against the back wall of the compartment. The cabinet contains a housing having a floor that slants downwardly from front to back and an evaporator coil is mounted in the front of the housing that is tilted rearwardly to reduce the height of the cabinet. A tangential blower wheel is mounted behind the coil and arranged to pass air from an inlet in the floor of the housing through the coil and out of the cabinet outlet. A shroud surrounds the blower wheel that cooperates with a baffle plate to efficiently conduct air through the unit. The top edge of the baffle forms the lower lip of the shroud exit region and the plate extends downward so that its lower edge is adjacent to the bottom of the coil to establish a converging air passage with the rear face of the coil to evenly distributes the air flow passing through the coil. A pan is mounted in the floor of the housing to collect condensate from the coil. The pan is exposed to a portion of the blower wheel so that positive pressure developed by the wheel helps to force collected condensate out of the back of the unit.

12 Claims, 4 Drawing Sheets

EVAPORATOR UNIT FOR SMALL BUS

BACKGROUND OF THE INVENTION

This invention relates to an evaporator unit particularly suited for use in a small bus or the like and, in particular, to a compact ceiling mounted evaporator unit for efficiently cooling the passenger compartment of a small bus.

Small buses, shuttle buses, or mini-buses are finding widespread use because they are a convenient way to transport small groups of people from place to place that would be uneconomical to transport in a large vehicle. Many of the present day air conditioning units that are available for use in buses involve relatively complex systems utilizing a number of evaporators that are spaced apart along the length of the passenger compartment. Each evaporator is arranged to circulate a band of air across the width of the bus. The evaporator units are typically suspended directly over the head of passengers seated along one side of the bus or other congested areas such as door areas and the like, leaving little room for passengers to move about and they also prevent the installation of overhead baggage racks in these locations. Carrying condensate away from these side mounted units has also presented problems and the units oftentimes sweat or leak over the passenger seats causing unwanted passenger discomfort and damage.

In other bus applications which employ a single evaporator, the bus must generally be considerably modified to house the evaporator heat exchanger and the air handling equipment associated therewith. The cooled air from the evaporator in many cases must be ducted over some distance before it is discharged thereby increasing the cost of the unit while lowering the efficiency of the system. Ducting of the comfort air can also, under certain conditions, produce uneven cooling within the passenger compartment.

SUMMARY OF THE INVENTION

It is, therefore, an object of the present invention to improve air conditioning systems for use in smaller type buses.

A further object of the present invention is to provide a high efficiency air conditioning unit for smaller size buses.

A still further object of the present invention is to provide a low profile evaporator unit that can be suspended from the ceiling of a small bus within a location where it will not adversely effect passenger comfort and movement.

Another object of the present invention is to provide a modularized blower assembly for use in a low profile evaporator unit that can be easily adapted to accommodate evaporator units of varying widths.

Yet another object of the present invention is to more effectively conduct condensate away from an evaporator unit that is suspended from the ceiling of a bus.

These and other objects of the present invention are attained by an air conditioning system for use in a small size bus. The system contains a single evaporator unit that is suspended from the ceiling of the passenger compartment in a location where it will not interfere with the comfort and movement of passengers and is arranged to circulate comfort air along the length of the compartment. The evaporator unit includes a low profile cabinet that extends substantially across the width of the compartment. The cabinet contains a housing having a floor that slants downwardly from front to back. An evaporator coil is mounted in the front of the housing and is tilted rearwardly to form an acute angle with the floor of the housing. A tangential blower wheel is mounted behind the coil and is arranged to pass air from an inlet located in the floor of the housing through the coil and out of a converging nose section at the front of the housing. A shroud surrounds the blower wheel and is configured to establish a diverging flow passage about the wheel. A baffle plate extends downwardly from the exit to the flow passage to the bottom of the coil to establish a diverging air passage for uniformly distributing discharged air from the blower over the entrance to the coil. The top edge of the baffle is positioned above the axial centerline of the blower wheel and adequate space is provided beneath the plate so that the condensate in the pan is exposed to a positive pressure which helps to force the collected condensate out of the pan through the back of the housing.

BRIEF DESCRIPTION OF THE DRAWINGS

For a better understanding of these and other objects of the present invention, reference shall be made to the following detailed description of the invention which is to be read in association with the accompanying drawings, wherein.

DESCRIPTION OF THE INVENTION

Turning initially to FIGS. 1–5 there is shown an evaporator unit 10 suitable for use in a small passenger bus of the type that has come into prominent use in recent years. The term small bus, as herein used, refers to a bus having a size and seating capacity that is less than a more conventional size bus, and which can seat between 10–30 passengers. This type of bus is sometimes referred to as a mini bus or a shuttle bus which is designed to transport a relatively small number of people over a relatively short distance. As noted above, the air conditioning system presently used in conventional sized buses are generally unsuitable for use in smaller size mini buses because of size and shape.

Figure 1:
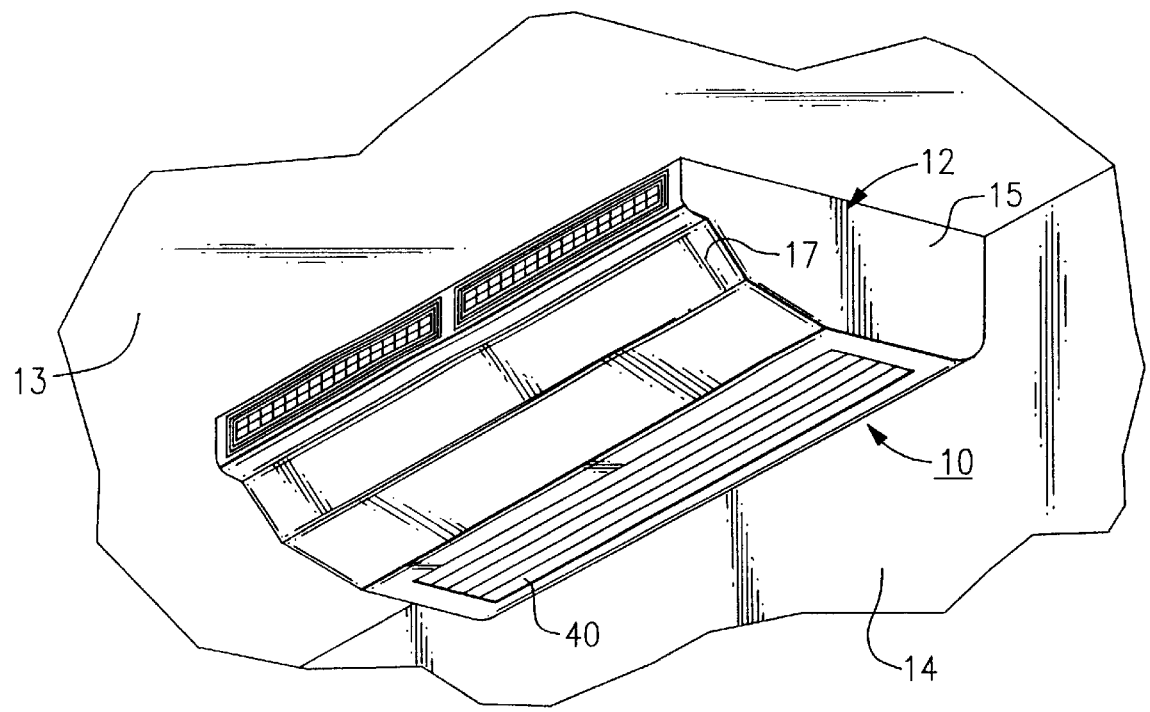
FIG. 1 is a partial perspective view showing an evaporator cabinet, embodying the teachings of the present invention, mounted upon the ceiling at the rear wall of a bus.
Figure 2:
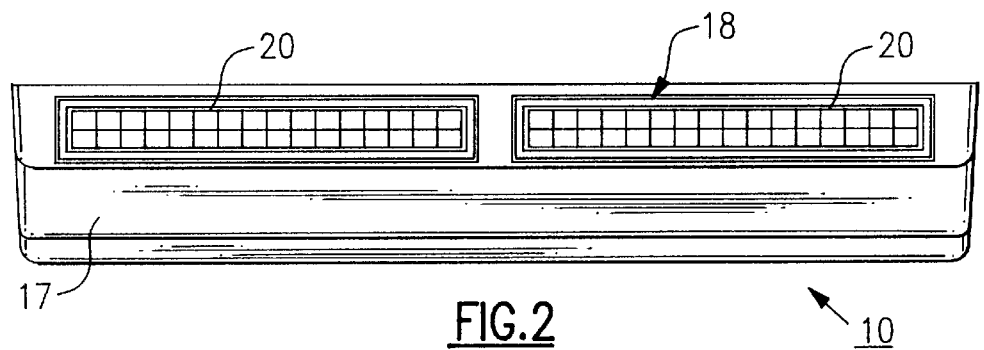
FIG. 2 is an enlarged front view of the cabinet shown in FIG. 1.
Figure 3:
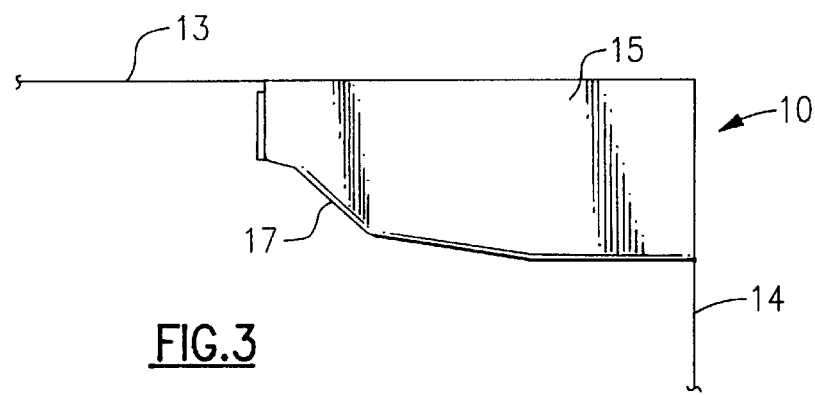
FIG. 3 is a side elevation of the cabinet shown in FIG. 1.

The air conditioning system employed in association with the present invention involves a condenser and a compressor that are mounted outside of the passenger compartment typically in the motor compartment of the vehicle. As illustrated in FIG. 1, the system evaporator is contained in a low profile cabinet 12 that is mounted by suitable bracket in the ceiling 13 of the bus against the rear wall 14 of the passenger compartment. It should be evident that the cabinet can be mounted anywhere in the passenger compartment where it will not interfere with the comfort or mobility of the passengers.

The cabinet extends substantially across the width of the passenger compartment and includes a main housing section 15 that is in fluid flow communication with a converging nose section 17. An air outlet 18 is located in the front wall of the nose section that contains one or more adjustable louver grates 20 that direct and distribute conditioned air leaving the evaporator unit along the ceiling of the passenger compartment. The leaving air stream is directed along the length of the passenger compartment, and over the driver's station before being circulated back to the rear of the passenger compartment.

Figure 4:
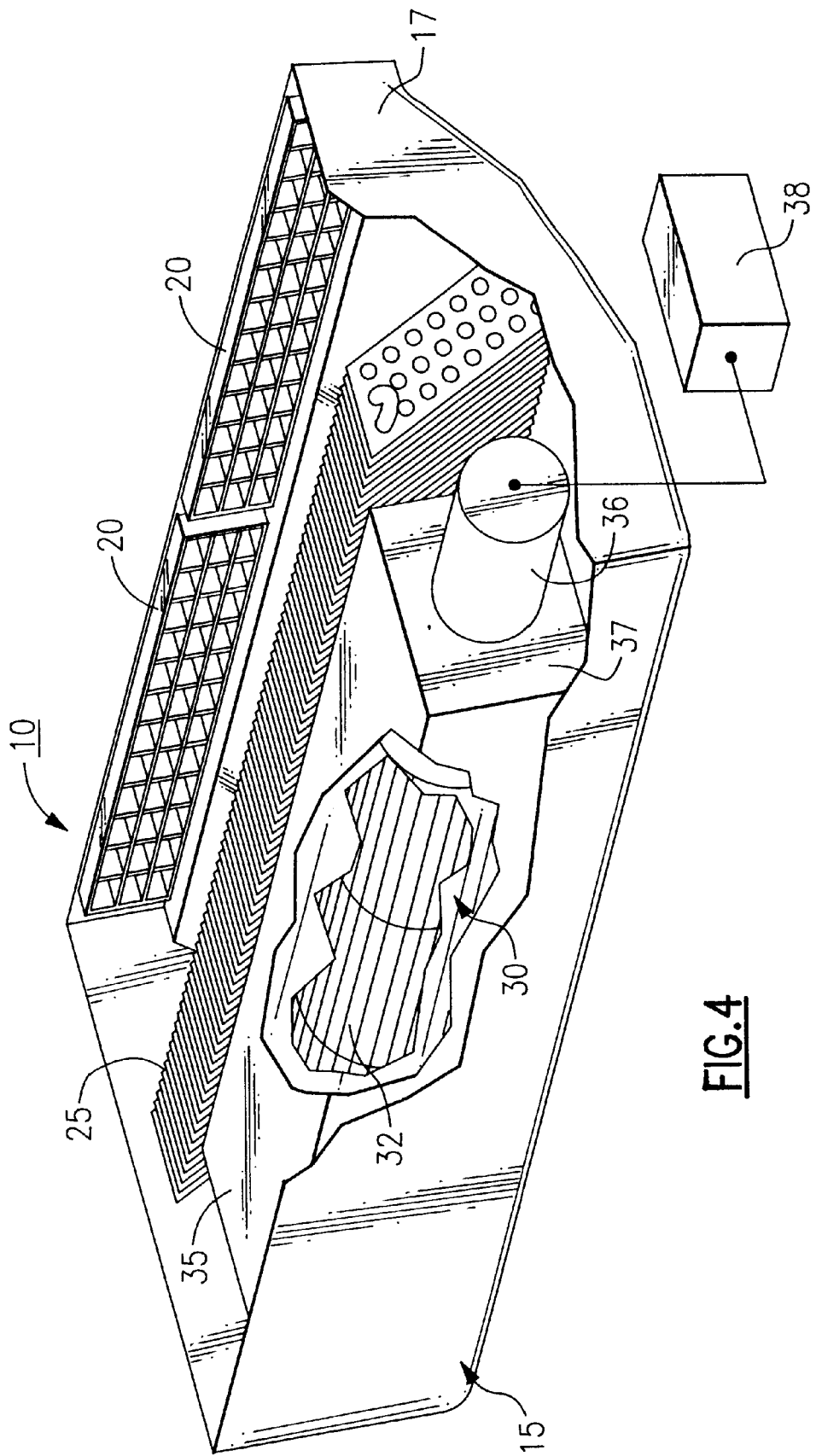
FIG. 4 is an enlarged perspective view of the cabinet with portions broken away to show components housed within the cabinet.
Figure 5:
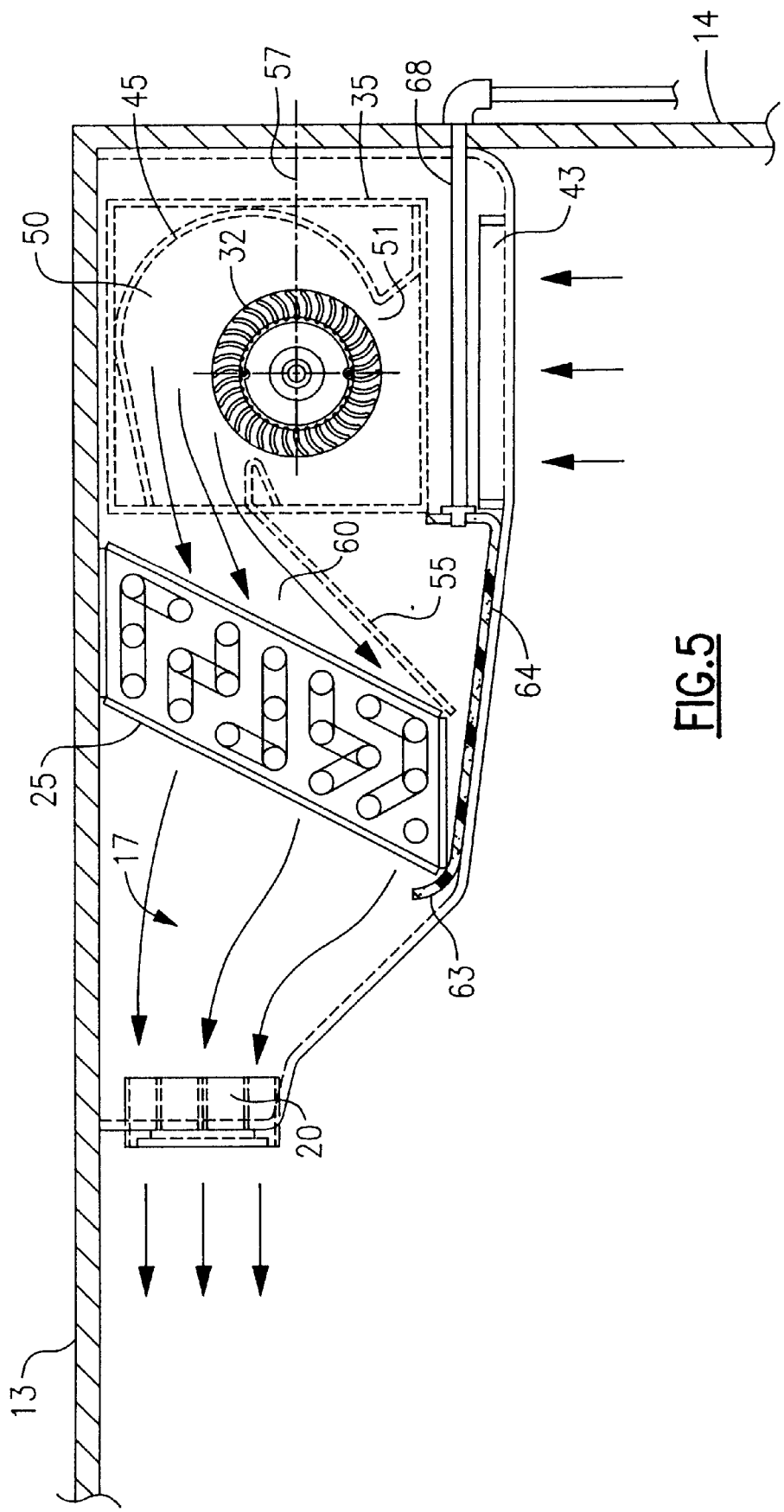
FIG. 5 is an enlarged side view in section showing the interior of the cabinet.
Figure 6:
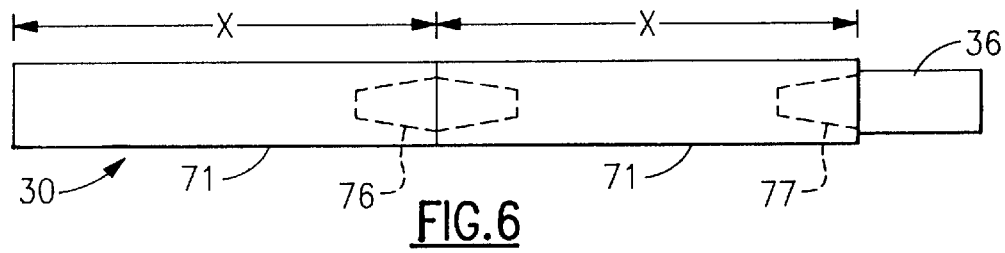
FIGS. 6–10 illustrate schematically various blower wheel configurations that can be generated for different width cabinets.
Figure 7:
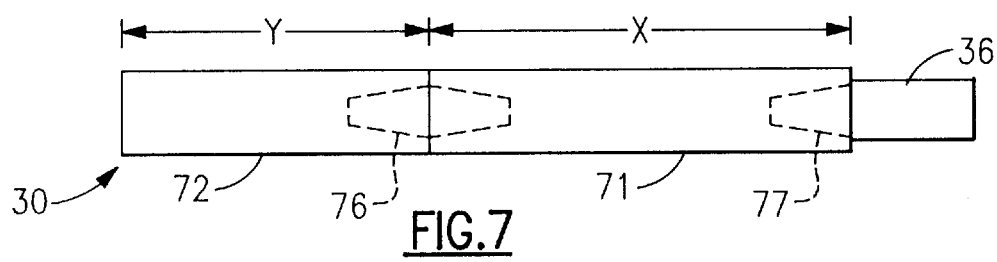
Figure 8:
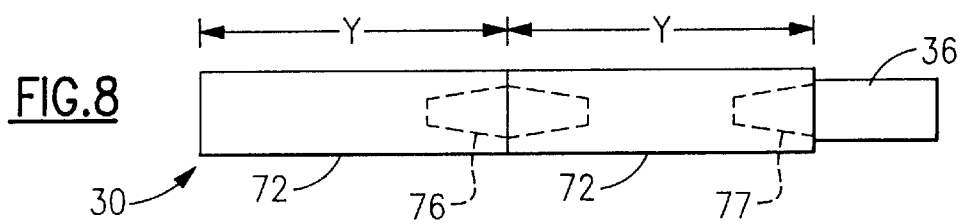
Figure 9:
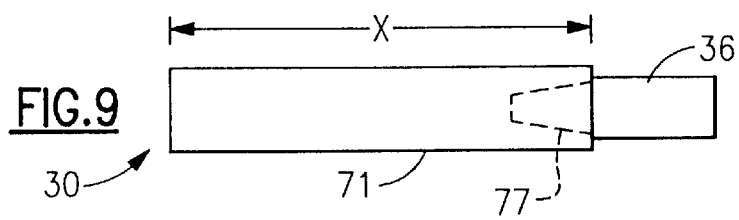
Figure 10:
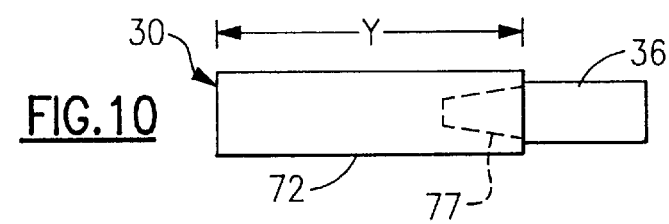

As further illustrated in FIGS. 4 and 5, an evaporator coil 25 is mounted in the front part of the main housing section of the cabinet and extends substantially across the width of the cabinet. The evaporator coil is tilted toward the rear of the cabinet to form an acute angle with the floor of the cabinet thereby reducing the amount of vertical space required to house the coil without appreciably sacrificing the heat transfer surface area of the coil.

A tangential blower, generically referenced 30, is mounted directly behind the evaporator coil within the main housing of the cabinet. The blower includes a modular blower wheel 32 that is rotatably mounted upon suitable bearings within the blower housing 35. The blower wheel is driven by a single motor 36 that is mounted outside the blower housing upon one end wall 37 of the housing. The blower is driven by a single or variable speed motor having a pulse width modulator or other form of controller 38 (FIG. 5) that can be regulated to control the flow of comfort air discharged from the evaporator. The variable speed motor is the only control necessary for regulating the flow of comfort air within the passenger compartment.

Input air to the evaporator unit is drawn into the cabinet through an inlet grill 40 mounted in the floor of the main housing section beneath the blower housing. An air filter 43 is mounted inside the cabinet over the inlet grill. Although not shown, the grill is removable, thus providing ready access to a filter whereby the filter can be easily periodically changed when necessary.

The blower wheel 32 is surrounded by a shroud 45 as illustrated in FIG. 5 to establish a diverging flow passage 50 around the wheel. Incoming air enters the blower wheel through a throat 51 that extends across the lower portion of the wheel above the air inlet duct. The air leaves the blower wheel in a generally horizontal direction through the exit region 53. Due to the shape of the air passage, the velocity of the air decreases while the pressure is increased. A baffle plate 55 is positioned at the exit of the blower flow passage with the top edge of the plate forming the lower lip of the exit region. The top edge of the baffle plate is positioned above the axial center line 57 of the blower wheel and extends downwardly at an angle to terminate along the lower back edge of the evaporator coil to create a diverging entrance region 60 to the evaporator coil. The baffle plate is arranged so that the air flow passing through the entrance to the evaporator coil is evenly distributed over the coil entrance area to produce uniform heat transfer throughout the coil.

The cooled air passing through the coil enters the converging nose section where its velocity is increased and is then discharged from the cabinet through the outlet ducts 20. The cooled comfort air leaves the cabinet at a relatively high velocity and is directed along the ceiling of the passenger compartment to create a generally circular flow of air that circulates laterally through the passenger compartment.

A pan 63 is mounted upon the floor 64 of the main housing section of the cabinet directly beneath the evaporator coil 25 to collect condensate from the coil. The floor slopes downwardly toward the rear wall 14 of the passenger compartment so that condensate collected in the pan moves to the back of the pan under the influence of gravity. The back of the pan extends rearwardly beyond the lower back edge of the evaporator coil and is exposed to the blower wheel which causes a positive pressure to be exerted upon the condensate collected in the pan. Drain lines 68 are mounted in the back wall of the pan and pass rearwardly on either side of the cabinet air inlet duct 43. The drain lines pass through the rear wall of the cabinet and the rear wall of the passenger compartment and pass downwardly below the bus chassis to release the condensate to ambient.

Turning now to FIGS. 6–10, there is illustrated in schematic form the modular blower arrangement used in the practice of the present invention. The present evaporator unit is designed so that different length wheels can be employed with a single variable speed motor. To this end, the axial length of the blower can be changed by simply interconnecting two different length wheels end to end. One wheel 71 has an axial length X while the second wheel 72 has a shorter length Y. As illustrated, the wheels can be brought together in various combinations to provide five modules of different lengths. Accordingly, blower units of different lengths can be constructed using a minimum amount of parts which, in turn, can be employed in different size cabinets. The wheels are cojoined together and joined to the single drive motor by connectors 76 and 77, respectively, or any other suitable connector that will provide for ease of interchangeability of the wheels. A single drive motor as described above is used in conjunction with each configuration with the speed of the motor being regulated to accommodate the demands of the specific configurations without considerably sacrificing efficiency and performance. Although the blower motor is shown positioned at one end of the wheel assembly, it can also be mounted between wheel sections to drive one or more sections from both sides of the motor.

As should be evident from the disclosure above, the present invention provides for an extremely low profile evaporator unit that can be mounted at the rear of the passenger compartment of a small bus where it will not interfere with the passengers' ability to move freely about the compartment. In addition, the unit, through its drainage system, can efficiently remove condensate from the passenger compartment without the danger of leakage. The modular blower wheel design used in conjunction with a single pulse width modulated controlled motor allows for accurate control over the motor speed resulting in higher efficiency in performance with a lower current drain on the buses electrical system.

While this invention has been explained with reference to the structure disclosed herein, it is not confined to the details set forth and this invention is intended to cover any modifications and changes as may come within the scope of the following claims:

We claim:

1. A low profile evaporator unit for use in a bus equipped with an air conditioning system, said evaporator unit including a cabinet for housing an evaporator unit that is mounted upon the ceiling of a bus passenger compartment, said cabinet including a main housing extending along the width or length of the compartment against a rear, front or side wall and a nose second containing an air outlet for distributing comfort air across the ceiling along the length of the compartment, said main housing further including a floor that slopes downwardly from the front of the housing to the rear of the housing, an evaporator coil mounted in the front of said housing, a tangential blower mounted in the housing behind the evaporator coil for drawing air into the housing through an air inlet located in the floor of the housing beneath the blower and directing the air through the evaporator coil and discharging the air flow through said air outlet, a drain pan mounted in the floor of the housing beneath the evaporator coil for collecting condensate from said coil, flow means connected to the back of the pan for carrying condensate collected in the pan out of the back of said compartment, and a baffle plate mounted in the exit region of said blower that is arranged to expose the pan to a portion of the said blower so that a positive pressure is exerted on condensate collected in said pan to force said condensate through said flow means.

2. The evaporator unit of claim 1 wherein said evaporator coil is tilted within the cabinet to form an acute angle with the floor of the housing.

3. The evaporator unit of claim 1, wherein said flow means includes lines that pass along both sides of the air inlet to said housing and through the back wall of the cabinet.

4. The evaporator unit of claim 1 wherein the motor is powered by a variable speed control source.

5. The evaporator unit of claim 1, wherein said blower includes a horizontally disposed tangential blower wheel assembly that extends along the back of the evaporator coil and a motor connected to one side of the blower wheel.

6. The evaporator unit of claim 5 that further includes a shroud that surrounds the blower wheel to establish an air passage that diverges from an entrance located adjacent to the cabinet air inlet toward an exit located above the axial center line of the blower wheel.

7. The evaporator unit of claim 6, wherein said baffle plate includes an inclined wall that has a top edge that extends across the length of the blower wheel above the axial center line of the wheel to form a lower rim of the blower exit region and a bottom edge that extends along the bottom of the evaporator coil.

8. The evaporator unit of claim 7, wherein said baffle wall forms a diverging air diffuser with the back face of the evaporator coil to uniformly distribute the air flow leaving the blower wheel over the coil.

9. The evaporator unit of claim 1, wherein said blower wheel assembly contains at least two sections that are connected end to end in axial alignment whereby blower wheels of varying length can be constructed from wheel sections of the same length or different lengths.

10. The evaporator unit of claim 1, wherein said cabinet is molded of plastic, and the drain pan is formed of a plastic that is bonded to the cabinet floor to form an integral leak-proof assembly.

11. The evaporator unit of claim 10, wherein said cabinet further includes a nose section that is in communication with the front of said housing and which includes a front face that contains said air outlet.

12. The evaporator unit of claim 11, wherein said nose section converges from the front of the housing toward the air outlet to increase the velocity of the air flow leaving the cabinet.

* * * * *